US009020942B2

(12) United States Patent
Uchiyama et al.

(10) Patent No.: US 9,020,942 B2
(45) Date of Patent: Apr. 28, 2015

(54) MAINTENANCE OPERATION INSTANCE COLLECTION APPARATUS, MAINTENANCE OPERATION INSTANCE COLLECTION METHOD, AND MAINTENANCE OPERATION INSTANCE COLLECTION PROGRAM

(75) Inventors: Hiroki Uchiyama, Kawasaki (JP); Shinya Yuda, Hitachi (JP); Kozo Nakamura, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 68 days.

(21) Appl. No.: 13/702,771

(22) PCT Filed: Jun. 8, 2010

(86) PCT No.: PCT/JP2010/059657
§ 371 (c)(1),
(2), (4) Date: Dec. 7, 2012

(87) PCT Pub. No.: WO2011/155023
PCT Pub. Date: Dec. 15, 2011

(65) Prior Publication Data
US 2013/0091134 A1    Apr. 11, 2013

(51) Int. Cl.
*G06F 17/30* (2006.01)
*G06Q 10/00* (2012.01)
*G06Q 30/00* (2012.01)

(52) U.S. Cl.
CPC .......... *G06F 17/30424* (2013.01); *G06Q 10/20* (2013.01); *G06Q 30/016* (2013.01)

(58) Field of Classification Search
CPC .......... G06F 17/30424; G06F 11/3452; G06F 2201/80; G06Q 30/016; G06Q 10/20; G06Q 10/06; G06Q 10/0635; G06Q 10/063; G06Q 10/0631; G06Q 10/063114; G06Q 10/087; G06Q 30/00; G06Q 50/22; G06Q 50/24; G06Q 99/00; G06Q 10/00
USPC ............ 707/736; 702/182, 183, 184, 185, 34, 702/50; 701/1, 50, 99, 29, 117; 714/26, 48, 714/22, 42, 15
See application file for complete search history.

(56) References Cited

U.S. PATENT DOCUMENTS 7,124,059 B2 * 10/2006 Wetzer et al. ................. 702/184
(Continued)

FOREIGN PATENT DOCUMENTS

| JP | 2003-15877 | 1/2003 |
|---|---|---|
| JP | 2005-141292 | 6/2005 |

(Continued)

OTHER PUBLICATIONS

A Kibata, S Hirasaki, K Hatakeyama—Kawasaki Steel Tech. Rep., 1985—202.229.24.177—"Outline of Advanced Total Information System for Cold Rolling at Mizushima Works"—Kawasaki Steel Technical Report—No. 13, Sep. 1985—pp. 129-139.*

(Continued)

*Primary Examiner* — Anh Ly
(74) *Attorney, Agent, or Firm* — Baker Botts L.L.P.

(57) ABSTRACT

A maintenance operation instance collection apparatus includes: a storage unit that includes a maintenance operation instance database in which operation information obtained from a device via a sensor and maintenance information on a measure to deal with the operation information corresponding thereto are stored in association with each other; and a control unit that receives an input of new operation information, receives an input of new maintenance information, searches the maintenance operation instance database using the newly-received maintenance information as a search key, acquires searched operation information, compares the newly-received operation information to the acquired operation information, determines whether or not the newly-received operation information is close to the acquired operation information in such a degree of satisfying a prescribed criterion, and, if the newly-received operation information is not determined to be close to the acquired operation information, prompts a re-input of the newly-received maintenance information.

11 Claims, 11 Drawing Sheets

(56) References Cited

U.S. PATENT DOCUMENTS

| | | | |
|---|---|---|---|
| 8,032,789 B2* | 10/2011 | Horikoshi | 714/31 |
| 8,655,698 B2* | 2/2014 | West et al. | 701/29.3 |
| 2003/0130820 A1* | 7/2003 | Lane, III | 702/184 |
| 2004/0093102 A1* | 5/2004 | Liiri et al. | 702/184 |
| 2004/0254684 A1* | 12/2004 | Nagafuchi et al. | 700/286 |
| 2005/0043924 A1* | 2/2005 | Ito et al. | 702/184 |
| 2005/0194590 A1* | 9/2005 | Matsushita et al. | 257/48 |
| 2006/0293866 A1* | 12/2006 | Utaka et al. | 702/133 |
| 2007/0185685 A1* | 8/2007 | Lannes et al. | 702/184 |
| 2009/0024542 A1* | 1/2009 | Tanaka et al. | 705/400 |
| 2009/0033993 A1* | 2/2009 | Nakazato et al. | 358/1.15 |
| 2009/0249117 A1* | 10/2009 | Horikoshi | 714/6 |

FOREIGN PATENT DOCUMENTS

| | | |
|---|---|---|
| JP | 2006-215682 | 8/2006 |
| JP | 2008-59028 | 3/2008 |
| JP | 2008-310582 | 12/2008 |
| JP | 2009-230700 | 10/2009 |
| WO | WO 2009/150737 A1 | 12/2009 |

OTHER PUBLICATIONS

Qiang Li, Alex Tsukerman, Edward Hong—"Fault-Tolerance Issues in RDBMS on SCI-Based Local Area Multiprocessor (LAMP)"—Fault-Tolerant Parallel and Distributed Systems—1998—pp. 155-169.*

* cited by examiner

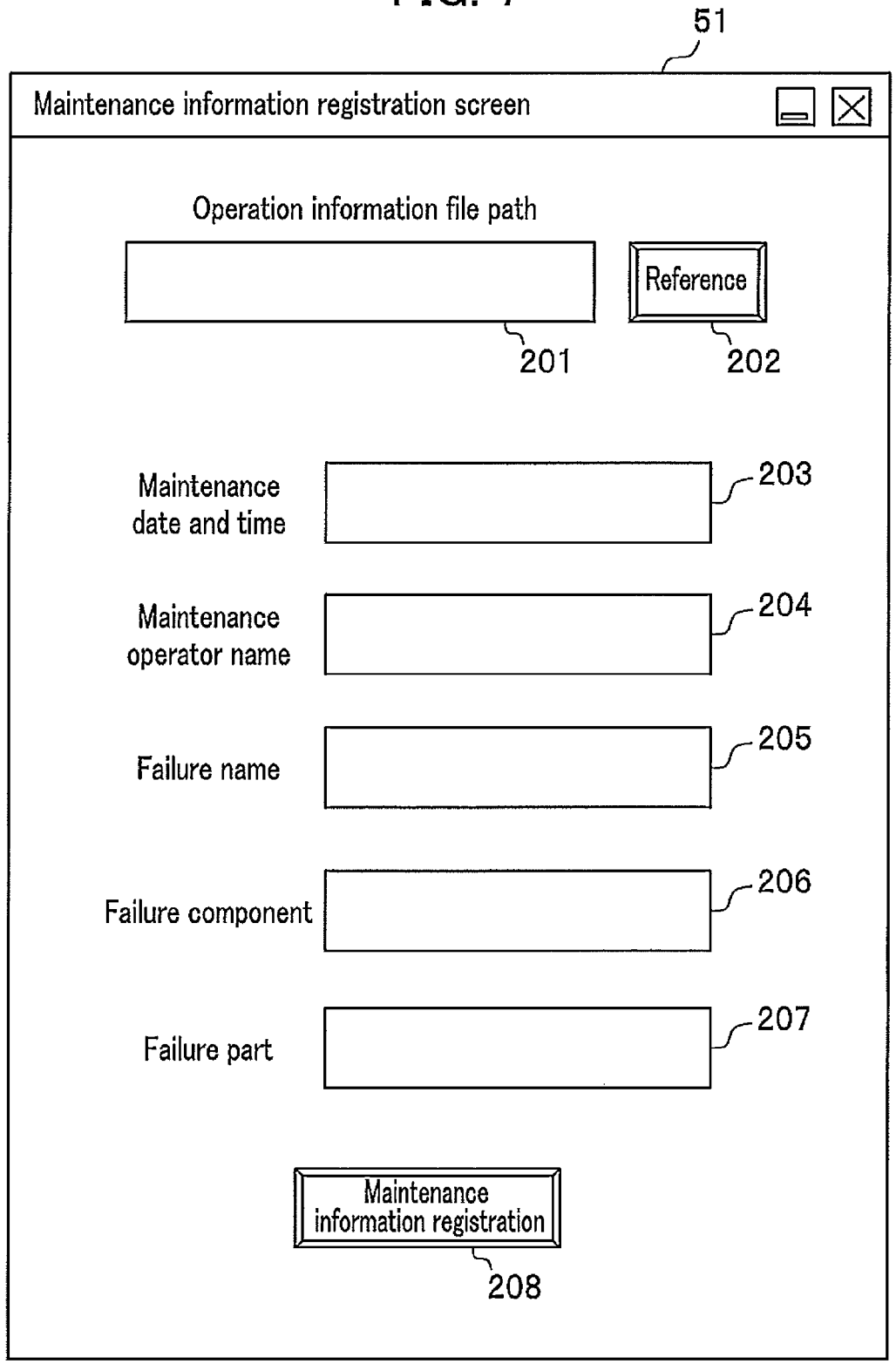

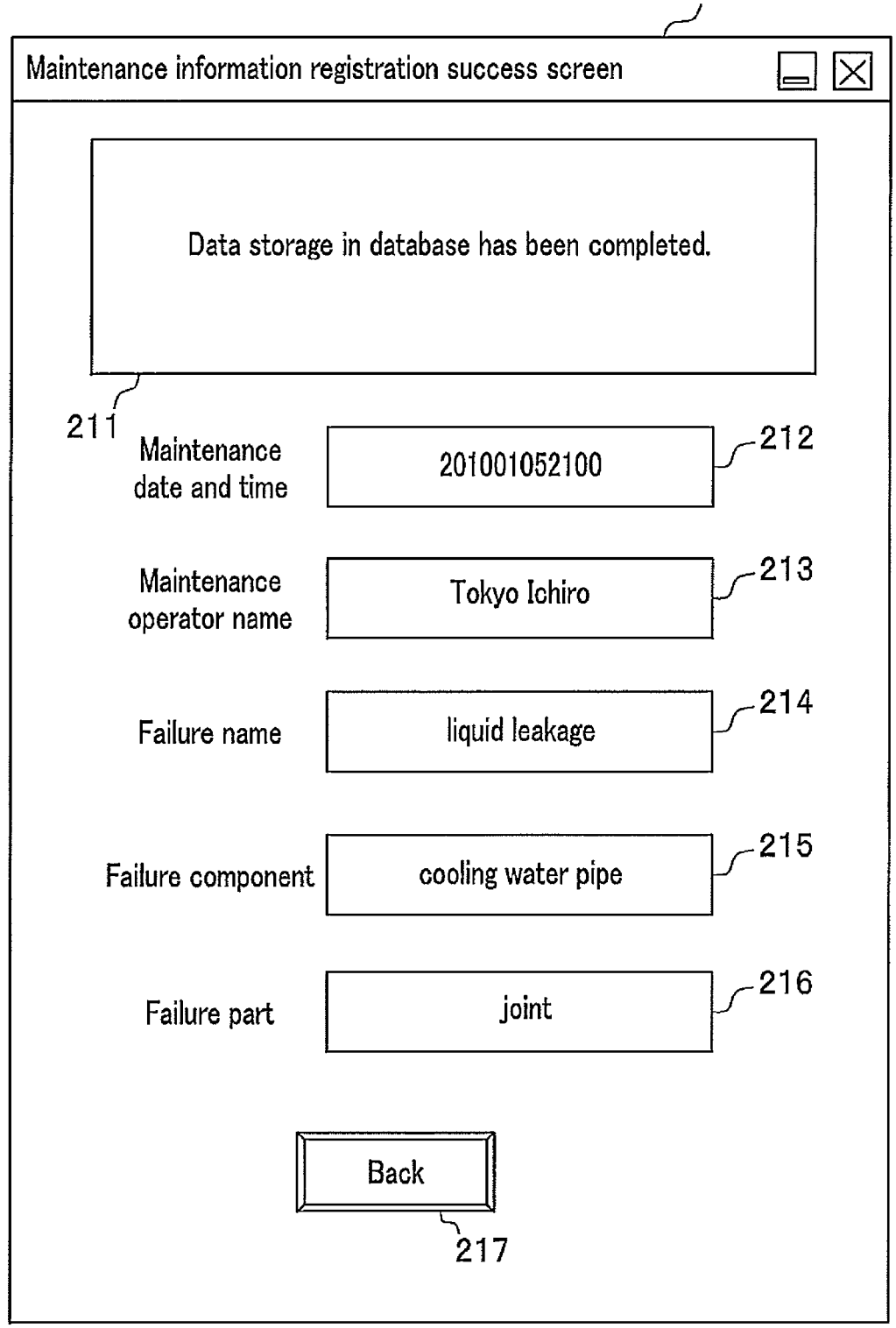

FIG. 9

Maintenance information reregistration screen

The operation information currently inputted is not appropriately relevant to past instances stored in the database. You are requested to review items on the following sensors and re-input appropriate operation information.

Sensor 1 to be reviewed: cooling water pressure (higher than past instances)
Sensor 2 to be reviewed: cooling water temperature (lower than past instances)

| Field | Value |
|---|---|
| Maintenance date and time | 201001052100 |
| Maintenance operator name | Tokyo Ichiro |
| Failure name | liquid leakage |
| Failure component | cooling water pipe |
| Failure part | joint |

[Maintenance information registration]

FIG. 11

Maintenance information registration initial screen — 54

Operation information ID — 231
[Operation information output] — 232

↓ Press down of "operation information output" button

Operation information post-output screen — 55

Operation information ID — 241: P101
[Operation information output] — 242

243b Operation information:
- Cooling Water Pressure vs Time
- Cooling Water Temperature vs Time
- Vibration Value vs Time Maintenance date and time — 244
Maintenance operator name — 245
Failure name — 246
Failure component — 247
Failure part — 248

[Maintenance information registration] — 249

MAINTENANCE OPERATION INSTANCE COLLECTION APPARATUS, MAINTENANCE OPERATION INSTANCE COLLECTION METHOD, AND MAINTENANCE OPERATION INSTANCE COLLECTION PROGRAM

TECHNICAL FIELD

The present invention relates to a maintenance operation instance collection apparatus, a maintenance operation instance collection method, and a maintenance operation instance collection program.

BACKGROUND ART

A technique of making a failure diagnosis while referring to a past failure instance has been known which is realized by collecting operation information of a device obtained from a sensor installed in the device and maintenance information indicating maintenance contents or the like (such as a failure name and a failure part) when the device has failed, in association with each other. In such a technique, if a maintenance operator makes an error in inputting the maintenance information, erroneous information is collected.

Techniques for preventing such an error are disclosed in, for example, Japanese Laid-Open Patent Application, Publication No. 2003-15877 (to be referred to as Patent Document 1 hereinafter) and Japanese Laid-Open Patent Application, Publication No. 2006-215682 (to be referred to as Patent Document 2 hereinafter). In the technique of Patent Document 1, a failure diagnosis of a device is performed based on inputted information concerning an operational status of the device, and, only if the diagnosis is successfully completed, an instance of interest is collected as a failure instance. In the technique of Patent Document 2, a maintenance operator inputs information concerning a device in failure in question-and-answer format in accordance with given guidance information, and the received information is accumulated to thereby gradually improve accuracy of the information concerning the device in failure.

RELATED ART DOCUMENT

Patent Documents

Patent Document 1: Japanese Laid-Open Patent Application, Publication No. 2003-15877 (paragraph 0039)
Patent Document 2: Japanese Laid-Open Patent Application, Publication No. 2006-215682 (paragraph 0055)

SUMMARY OF THE INVENTION

Problem to be Solved by the Invention

In the technique of Patent Document 1, however, if the diagnosis has failed, input of relevant data is refused. Correction or re-input of the data is also unavailable. In particular, when the number of past instances is still small, it is not easy to expedite accumulation of new instances.

In the technique of Patent Document 2, all of the information inputted by a maintenance operator is readily received on an assumption that it is always correct, which hinders improvement in reliability of accumulated information.

The present invention has been thus made in an attempt to accumulate maintenance information on a device which is excellent in both quality and quantity.

Means for Solving the Problem

A maintenance operation instance collection apparatus includes: a storage unit that includes a maintenance operation instance database in which operation information obtained from a device via a sensor and maintenance information on a measure to deal with the operation information corresponding thereto are stored in association with each other; and a control unit that receives an input of new operation information, receives an input of new maintenance information, searches the maintenance operation instance database using the newly-received maintenance information as a search key, acquires searched operation information, compares the newly-received operation information to the acquired operation information, determines whether or not the newly-received operation information is close to the acquired operation information in such a degree of satisfying a prescribed criterion, and, if the newly-received operation information is not determined to be close to the acquired operation information, prompts a re-input of the newly-received maintenance information.

Effects of the Invention

In the present invention, maintenance information on a device can be accumulated which is excellent in both quality and quantity.

BRIEF DESCRIPTION OF THE DRAWINGS

FIG. 7 is a diagram illustrating an example of a maintenance information registration screen according to the embodiment.

FIG. 8 is a diagram illustrating an example of a maintenance information registration success screen according to the embodiment.

FIG. 9 is a diagram illustrating an example of a maintenance information reregistration screen according to the embodiment.

FIG. 11 is a diagram illustrating another example of the maintenance information registration initial screen and the operation information post-output screen according to the embodiment.

EMBODIMENT FOR CARRYING OUT THE INVENTION

Below is described in detail an embodiment for carrying out the present invention (to be referred to as "this embodiment") with reference to related drawings.

<Maintenance Operation Instance Collection Apparatus>

Figure 1:
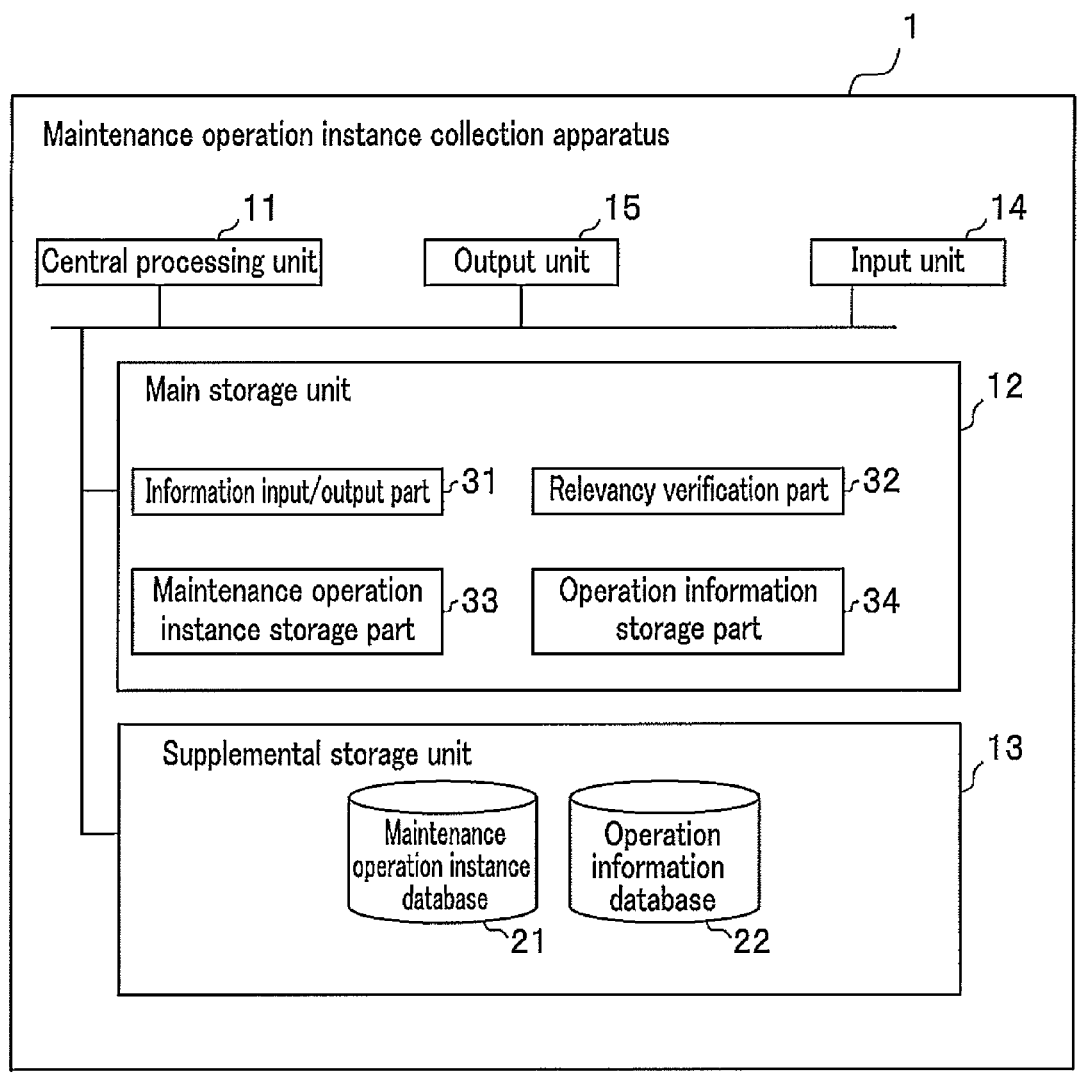
FIG. 1 is a configuration diagram illustrating a maintenance operation instance collection apparatus according to an embodiment of the present invention.

A maintenance operation instance collection apparatus 1 is described with reference to FIG. 1.

The maintenance operation instance collection apparatus 1 is embodied by a generally-available computer. The maintenance operation instance collection apparatus 1 includes a central processing unit 11, a main storage unit 12, an supplemental storage unit 13, an input unit 14, and an output unit 15, which are connected to each other via a bus.

The supplemental storage unit 13 includes a maintenance operation instance database 21 and an operation information database 22 (to be described in detail hereinafter).

The main storage unit 12 includes an information input/output part 31, a relevancy verification part 32, a maintenance operation instance storage part 33, and an operation information storage part 34, each of which is a program. To simplify description, it is assumed herein that the parts 31 to 34 directly perform their respective functions. Actually, however, it is the central processing unit 11 that reads and loads the parts 31 to 34 from the supplemental storage unit 13 into the main storage unit 12, and performs respective functions written in the units 31 to 34.

Each of the programs may be previously stored in the supplemental storage unit 13 or may be loaded into the maintenance operation instance collection apparatus 1 via an other storage medium or a communication medium where necessary.

One unit of the maintenance operation instance collection apparatus 1 is usually installed near a user who performs maintenance management of one or more devices. However, another configuration is available in which, for example, the maintenance operation instance collection apparatus 1 may be divided into a plurality of housings installed according to, for example, installation locations or types of the devices. In another configuration, for example, the information input/output part 31, the relevancy verification part 32, the maintenance operation instance storage part 33, and the operation information storage part 34 are configured independently from each other, and necessary data is received from and transmitted to each other via a network.

Further, the maintenance operation instance collection apparatus 1 may be configured to secure communication via a wired or wireless network with one or more user terminal devices (not shown) embodied by computers which are generally-available and each of which is provided independently and has a central processing unit, a main storage unit, an supplemental storage unit, an input unit, and an output unit. This configuration makes it possible for a maintenance operator to carry the one or more user terminal devices and exchange information with the maintenance operation instance collection apparatus 1 near the devices.

<Maintenance Operation Instance Database>

Figures 2, 3:
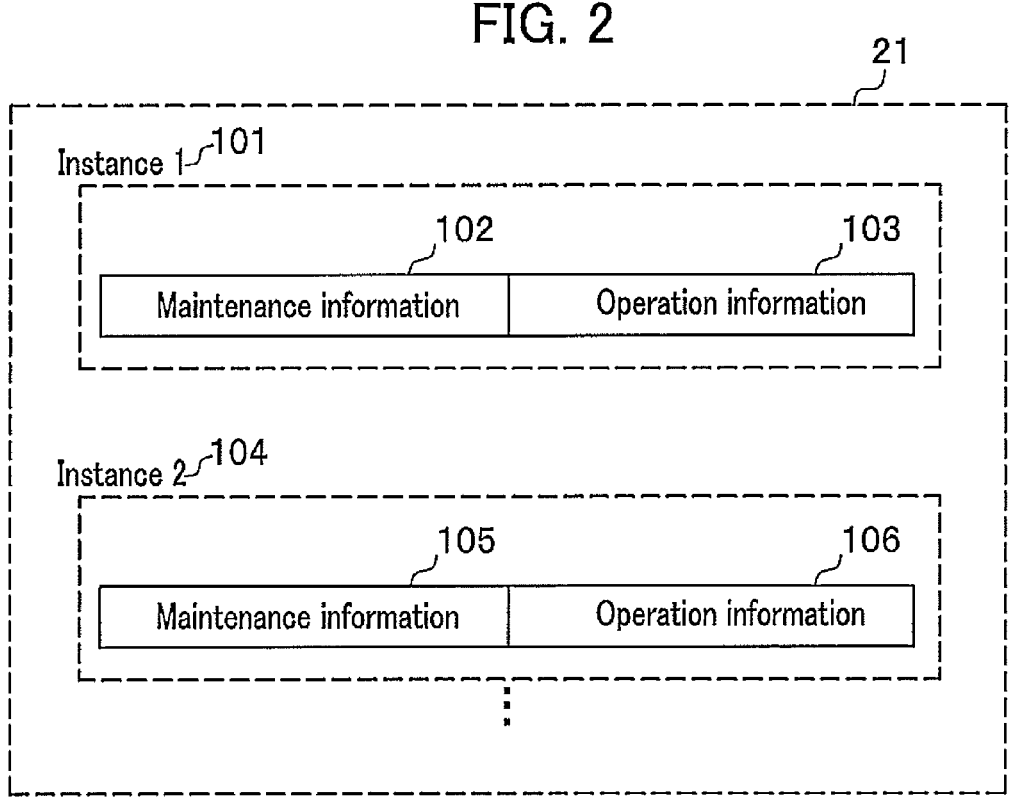
FIG. 2 is a diagram illustrating an example of maintenance operation instances according to the embodiment.
FIG. 3 is a diagram illustrating an example of operation information according to the embodiment.

Next is described the maintenance operation instance database 21 with reference to FIG. 2.

The maintenance operation instance database 21 stores therein maintenance information 102, 105, . . . and operation information 103, 106, . . . , in association with each other. A combination of a piece of operation information at a certain point in time and a piece of maintenance information describing a measure to deal with the operation information is herein referred to as an "instance" such as instances 101, 104, . . . .

The maintenance operation instance database 21 stores therein a plurality of the instances. Details of the maintenance information and the operation information will be described hereinafter.

<Operation Information Database>

Figure 4:
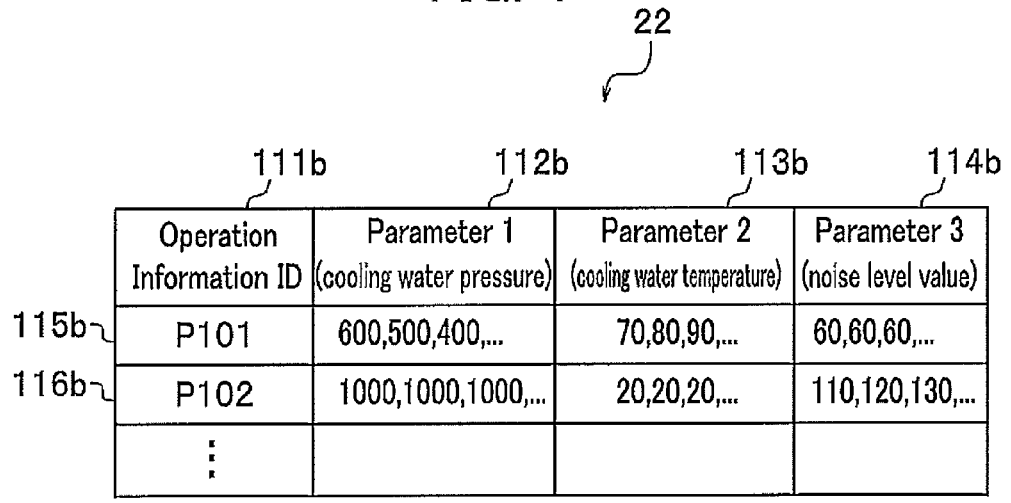
FIG. 4 is a diagram illustrating another example of the operation information according to the embodiment.

Next is described the operation information database 22 with reference to FIG. 3 and FIG. 4.

In the operation information database 22 of FIG. 3, a cooling water pressure is stored in a parameter 1 column 112a; a cooling water temperature, in a parameter 2 column 113a; and a noise level value, in a parameter 3 column 114a, all of which are made to correspond to respective operation information IDs stored in an operation information ID column 111a.

The operation information (each of records designated by the reference numerals 115a, 116a, . . . ) includes a single physical quantity or a combination of plural physical quantities acquired by using a sensor or the like installed in a device. If the operation information includes plural physical quantities, those physical quantities are assumed to be acquired at the same time. In describing this embodiment, let the device be a power generating gas turbine.

The operation information ID in the operation information ID column 111a is an identifier for uniquely identifying a piece of operation information.

The cooling water pressure in the parameter 1 column 112a is a pressure of a cooling water in a gas turbine acquired by a sensor (unit: hPa).

The cooling water temperature in the parameter 2 column 113a is a temperature of the cooling water of the gas turbine acquired by a sensor (unit: degrees Celsius).

The noise level value in the parameter 3 column 114a is a noise level value of the cooling water of the gas turbine acquired by a sensor (unit: decibel).

Note that, in the description below, each of a value of the cooling water pressure, a value of the cooling water temperature, and the noise level value may also be referred to as a "parameter" individually or collectively. The parameter is not limited to those shown above and may be any physical quantity as long as it is measurable. The parameter may also be a value converted from any physical quantity as shown above using a prescribed logic. In addition to the aforementioned columns, a parameter 4 column, a parameter 5 column, or the like may be used. Other columns may also be used such as a date and time column in which a date and time when a parameter is acquired is stored, a device ID column in which a device identifier for uniquely identifying a device is stored, and an installation location column in which an installation location of the device is stored.

The operation information database 22 of FIG. 4 is different from the operation information database 22 of FIG. 3 in that the former includes such parameters as a cooling water pressure, a cooling water temperature, and a vibration value each of which has a plurality of time series elements. For example, a parameter 1 column 112b of the record 115b stores therein "600, 500, 400, . . . " which indicate that: a cooling water pressure at 0:00 a.m. one day was 600 hPa; at 1:00 a.m., 500 hPa; at 2:00 a.m., 400 hPa; (ditto on the hour until 11:00 p.m.), and so do a parameter 2 column 113b and a parameter 3 column 114b.

Whether the operation information database 22 stores therein a value in a parameter column as shown in FIG. 3 or FIG. 4 is up to a user's choice of setting.

FIG. 4 with time-series values has an advantage in, for example, a user's easier understanding of a change in values on a certain day.

<Maintenance Information>

Figure 5:
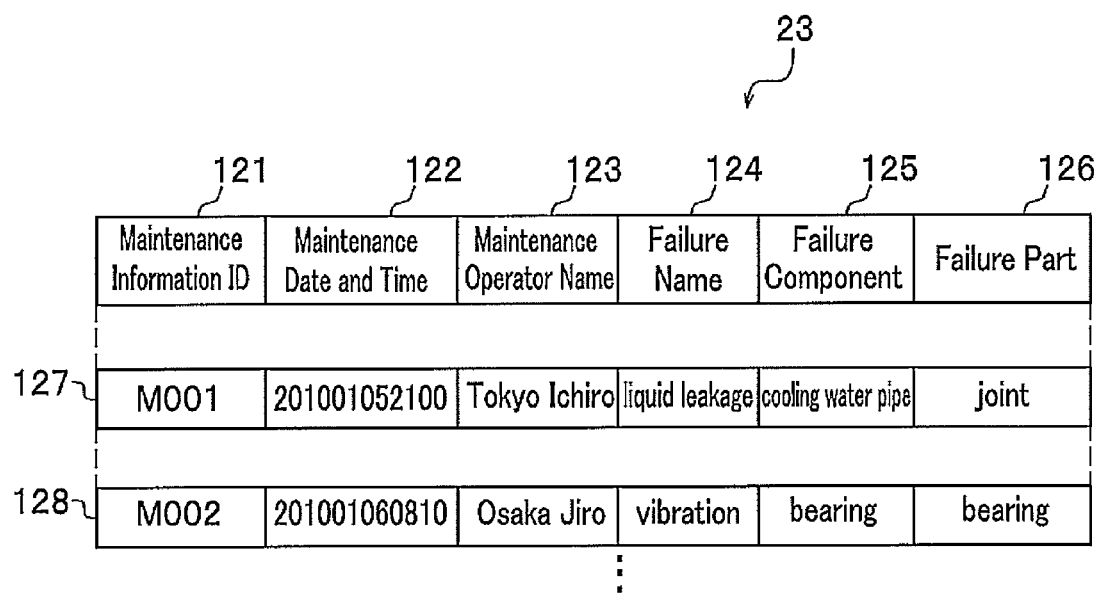
FIG. 5 is a diagram illustrating an example of maintenance information according to the embodiment.

Next is described the maintenance information 23 with reference to FIG. 5. The maintenance information herein means, as described above, information describing a measure or the like to deal with corresponding operation information, and more specifically, information on a maintenance log recorded by a maintenance operator especially when a failure occurs in a device.

The maintenance information 23 includes a maintenance information ID stored in a maintenance information ID column 121, a maintenance date and time stored in a maintenance date and time column 122, a name of a maintenance operator stored in a maintenance operator name column 123, a failure name stored in a failure name column 124, a failure component stored in a failure component column 125, and a failure part stored in a failure part column 126, all of which are associated with each other. In FIG. 5, each of records (designated by reference numerals 127, 128, . . . ) corresponds to the maintenance information.

The maintenance information ID in the maintenance information maintenance column 121 is an identifier uniquely identifying maintenance information.

The maintenance date and time in the maintenance date and time column 122 is a year, a month, a day, an hour, and a minute when a maintenance operator creates maintenance information.

The name of the maintenance operator in the maintenance operator name column 123 is a name of the maintenance operator who creates the maintenance information.

The failure name in the failure name column 124 is a character string plainly representing what is a failure in a device, such as, for example, "liquid leakage", "vibration", and "noise".

The failure component in the failure component column 125 is a name of a component which is replaced by the maintenance operator.

The failure part in the failure part column 126 is a name of a part at which the exchanged component failed.

Items included in the maintenance information are not limited to the described above. The maintenance information may include other items (such as a failure cause and a time from when a component is used). The maintenance information may omit one or more of the above items. However, the maintenance information preferably but necessarily includes at least one of the failure name, the failure component, and the failure part.

The operation information database 22 accumulates a record which a maintenance operator creates at an arbitrary point in time regardless whether or not a failure occurs in a device. The operation information database 22 may accumulate a record which the maintenance operation instance collection apparatus 1 or a device itself automatically creates at a prescribed point in time or with a prescribed period of time, based on information from a sensor.

Meanwhile, the maintenance information 23 is a record which a maintenance operator creates at a point in time when a failure occurs in a device. Whether or not those records are accumulated in a database is optional.

The operation information database 22 and the maintenance information 23 are not directly related to each other but are usually managed separately from each other. However, if the operation information database 22 and the maintenance information 23 are stored in a database as in the maintenance operation instance database 21 (FIG. 2) such as combinations of the operation information 103, 106, . . . and the maintenance information 102, 105, . . . , or if the operation information database 22 and the maintenance information 23 are stored in association with each other, then, the created database makes a database excellent in inductively showing which maintenance operation is required, when a device is in which state. Note that the operation information constituting an instance of FIG. 2 corresponds to a record of FIG. 3 (or FIG. 4). The maintenance information constituting an instance of FIG. 2 corresponds to a record of FIG. 5.

Value in using the "instance" of the maintenance operation instance database 21 is, however, greatly influenced by a degree of accuracy in relevancy between the maintenance information and the operation information. For example, in a case where "liquid leakage" occurs in a gas turbine, a cooling water pressure becomes lower than normal, a cooling water temperature becomes higher than normal, and a noise level value indicates no significant difference from normal. In a case where "vibration" occurs in a gas turbine, a cooling water pressure and a cooling water temperature indicate no significant differences from normal. A noise level value becomes higher than normal. Herein is assumed a case in which operation information of an instance in the maintenance operation instance database 21 exhibits the feature of the liquid leakage and maintenance information of the same instance includes "vibration", "bearing", and the like. It is obvious that the instance has no use value and false information has been stored. One of the possible causes for the erroneous storage of the instance is, for example, an error in data entry of the maintenance information such as a failure name. This embodiment can prevent such an erroneous input from occurring.

<Processing Procedure>

Figure 12:
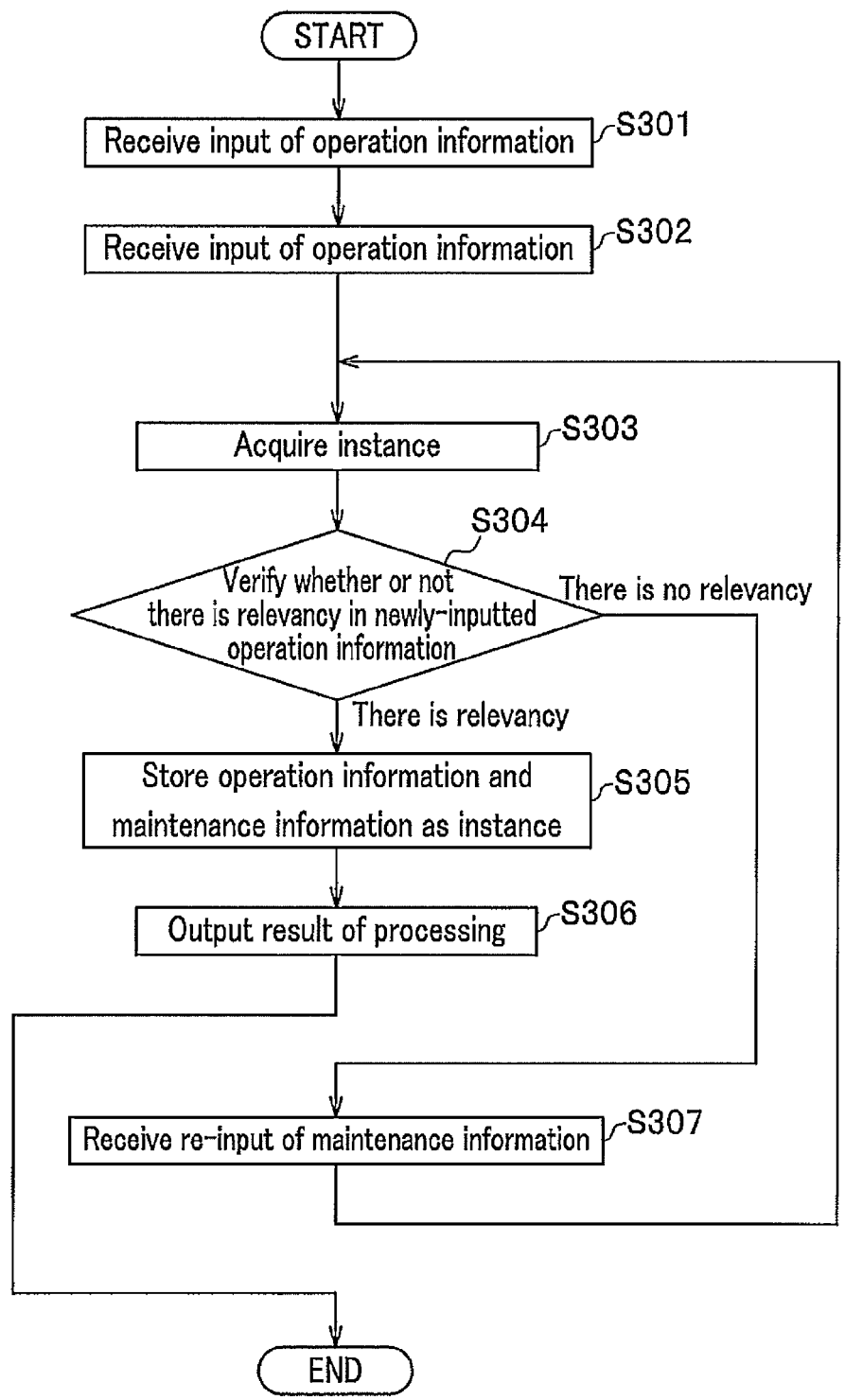
FIG. 12 is a flowchart of a processing procedure according to the embodiment.

Next is described a processing procedure according to this embodiment with reference to FIG. 12 as well as FIG. 6 to FIG. 11 where necessary.

In step S301, the information input/output part 31 receives an input of operation information.

More specifically, the information input/output part 31 receives inputs of a cooling water pressure, a cooling water temperature, and a noise level value by a user via the input unit 14 such as a keyboard.

Note that, in some cases, the operation information has previously been acquired by the maintenance operation instance collection apparatus 1 or a device of interest itself has already been stored in the operation information database 22. In this case, the information input/output part 31 displays a maintenance information registration screen 51 (FIG. 7) on the output unit 15.

The information input/output part 31 receives an input of information showing a location of the operation information database 22, in an operation information file path column 201 by the user. The information input/output part 31 may receive a press down of a "reference" button 202 by the user and display the information showing the location of the operation information database 22 (in some cases, a plurality of databases 22 are present). The information input/output part 31 then receives a selection of one piece of the information showing the location by the user. The information input/output part 31 displays the selected operation information database 22 on the output unit 14 and receives a selection of a specific record (operation information) by the user.

In step S302, the information input/output part 31 receives an input of maintenance information.

More specifically, firstly, the information input/output part 31 displays the maintenance information registration screen 51 (FIG. 7). If the screen 51 has already been displayed in step S301, however, it is not necessary to display the screen 51 twice. Secondly, the information input/output part 31 receives, from the user, inputs of a maintenance date and time, a name of a maintenance operator, a failure name, a failure component, and a failure part, in a maintenance date and time column 203, a maintenance operator name column 204, a failure name column 205, a failure component column 206, and a failure part column 207, respectively, on the maintenance information registration screen 51. At this time, it is not necessary for the information input/output part 31 to receive inputs in all of the columns 203 to 207. However, it is assumed herein that the information input/output part 31 receives at least one of the failure name column, the failure component column, and the failure part column. The order of receiving those inputs is arbitrary. The information input/output part 31 may display a current maintenance date and time in the maintenance date and time column 203 as a default value.

Thirdly, the information input/output part 31 receives a press down of a maintenance information registration button 208 by the user.

In step S303, the maintenance operation instance storage part 33 acquires an instance.

More specifically, the maintenance operation instance storage part 33 searches the maintenance operation instance database 21 (FIG. 2) using the failure name, the failure component, and the failure part received in step S302 as search keys. The maintenance operation instance storage part 33 acquires operation information of any instances each of whose maintenance information includes the failure name, the failure component, and the failure part used as the search keys.

In step S304, the relevancy verification part 32 verifies whether or not there is relevancy in the newly-inputted operation information.

Though details of this step will be described later, a rough outline thereof is that the relevancy verification part 32 determines whether or not there is relevancy in the newly-inputted operation information, based on proximity between the operation information whose input is received in step S301 and the operation information acquired in step S303.

More specifically, if the newly-inputted operation information does not include any abnormal parameter value (if "there is relevancy" in step S304), the relevancy verification part 32 determines that "there is relevancy" and advances the processing to step S305. On the other hand, if the newly-inputted operation information includes an abnormal parameter value (if "there is no relevancy" in step S304), the relevancy verification part 32 determines that "there is no relevancy" and advances the processing to step S307 while holding the abnormal parameter having an abnormal value and a "too-high-value (or too-low-value) warning" associated with the abnormal parameter.

In step S305, the maintenance operation instance storage part 33 stores therein the operation information and the maintenance information as an instance.

More specifically, the maintenance operation instance storage part 33 stores therein, as one "instance", the operation information whose input is received in step S301 and the maintenance information whose input is received in step S302 in association with each other, in the maintenance operation instance database 21. At this time, the maintenance operation instance storage part 33 takes a new maintenance information ID and stores therein the maintenance information with the new maintenance information ID in the instance. If an operation information ID of the maintenance operation is not yet determined, the maintenance operation instance storage part 33 takes a new operation information ID and stores therein the operation information with the new operation information ID in the instance.

Further, the operation information storage part 34 may add an operation information ID to the operation information whose input is received in step S301 and store the operation information in the operation information database 22 as a new record.

In step S306, the information input/output part 31 outputs a result of the processing.

More specifically, firstly, the information input/output part 31 displays a maintenance information registration success screen 52 (FIG. 8) on the output unit 15.

Secondly, the information input/output part 31 displays, in a message column 211, a message meaning that the newly-inputted operation information and the newly-inputted maintenance information are stored in association with each other. The message herein says "Data storage in database has been completed". Then, the information input/output part 31 displays the maintenance date and time, the name of the maintenance operator, the failure name, the failure component, and the failure part received in step S302, in the maintenance date and time column 212, the maintenance operator name column 213, the failure name column 214, the failure component column 215, and the failure part column 216, respectively.

If the user presses down a "Back" button 217, the maintenance information registration screen 51 appears again.

The processing then terminates.

In step S307, the information input/output part 31 again receives an input of maintenance information.

More specifically, firstly, the information input/output part 31 displays a maintenance information reregistration screen 53 (FIG. 9) on the output unit 15.

Secondly, the information input/output part 31 displays, in a message column 221, a message meaning that the newly-inputted operation information is not appropriately relevant to the newly-inputted maintenance information. Herein, the message says "The operation information currently inputted is not appropriately relevant to past instances . . . . You are requested to . . . re-input appropriate operation information." The information input/output part 31 then displays the "abnormal parameter" determined in step S304 (S406), in the message column 221.

Though details will be described later, the "abnormal parameter" is a parameter of the newly-inputted operation information in a case where, if a combination of operation information and maintenance information of a past instance is compared to a combination of the newly-inputted operation information and the newly-inputted maintenance information, although the two pieces of maintenance information match with each other, the two pieces of operation information greatly differ from each other.

The information input/output part 31 also displays a "too-high-value (or too-small-value) warning" (to be described in detail hereinafter) associated with the "abnormal parameter", in the message column 221. The message column 221 displays two "abnormal parameters", namely, the "cooling water pressure" and the "cooling water temperature". A "too-high-value warning (higher than the past instance)" is displayed in association with the "cooling water pressure" and a "too-low-value (lower than the past instance)" is displayed in association with the "cooling water temperature".

The information input/output part 31 may display information on a sensor corresponding to the "abnormal parameter" (for example, a "sensor 1 to be reviewed or the like). In this case, the supplemental storage unit 13 is assumed to store therein information on a sensor for each parameter.

Thirdly, the information input/output part 31 prompts the user to re-input all or a part of a failure name, a failure component, and a failure part, in all or a part of the failure name column 224, the failure component column 225, and the failure part column 226 (shaded portions of FIG. 9), respectively, in reference to contents displayed in the message column 221, and receives the inputted information. At this time, the columns 224, 225, 226 into which new data is to be re-inputted may be highlighted. The other columns 222, 223 may appear in a state in which an input thereinto is prohibited. The user re-inputs appropriate data into the columns 224, 225, 226 and presses down a "maintenance information reregistration" button 227.

Then, the processing returns to step S303. In this iteration, after step S303, the processing may skip step S304, perform step S305 and step S306, and then terminate.

<Details of Step S304>

Figure 13:
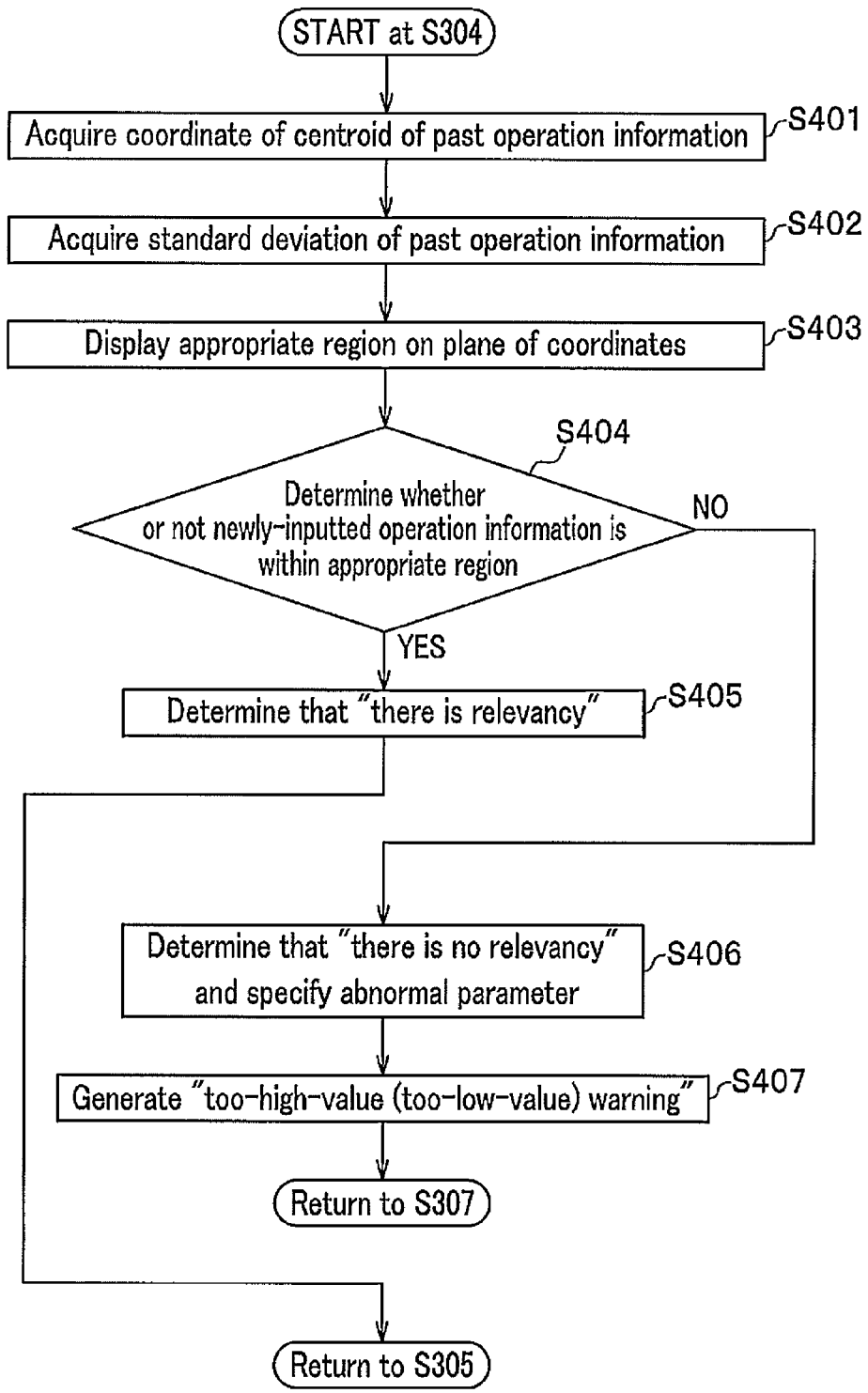
FIG. 13 is a flowchart of a detailed processing procedure of step S304 according to the embodiment.

Next is described a detailed processing procedure of step S304 with reference to FIG. 13.

To simplify description, it is assumed herein that: the operation information database 22 used is of a type illustrated in FIG. 3; the number of parameters of the operation information is two (the "cooling water pressure" and the "cooling water temperature"); and N pieces of the operation information are acquired in step S303.

In step S401, the relevancy verification part 32 acquires a coordinate of a centroid of past operation information.

More specifically, the relevancy verification part 32 calculates an average value (X0) of "cooling water pressure" values of the N pieces of operation information acquired in step S303. Similarly, the relevancy verification part 32 calculates an average value (Y0) of "cooling water temperature" values of the N pieces of the operation information.

In step S402, the relevancy verification part 32 acquires a standard deviation of the past operation information.

More specifically, the relevancy verification part 32 calculates, for each of the N pieces of operation information acquired in step S303, a distance from a point which has a value of the "cooling water pressure" as an x-coordinate and has a value of the "cooling water temperature" as a y-coordinate, to the coordinate of the centroid acquired in step S401. The relevancy verification part 32 then calculates a standard deviation ($\sigma$) of the distances.

In step S403, the relevancy verification part 32 displays a region satisfying relevancy on a plane of coordinates.

Figure 6:
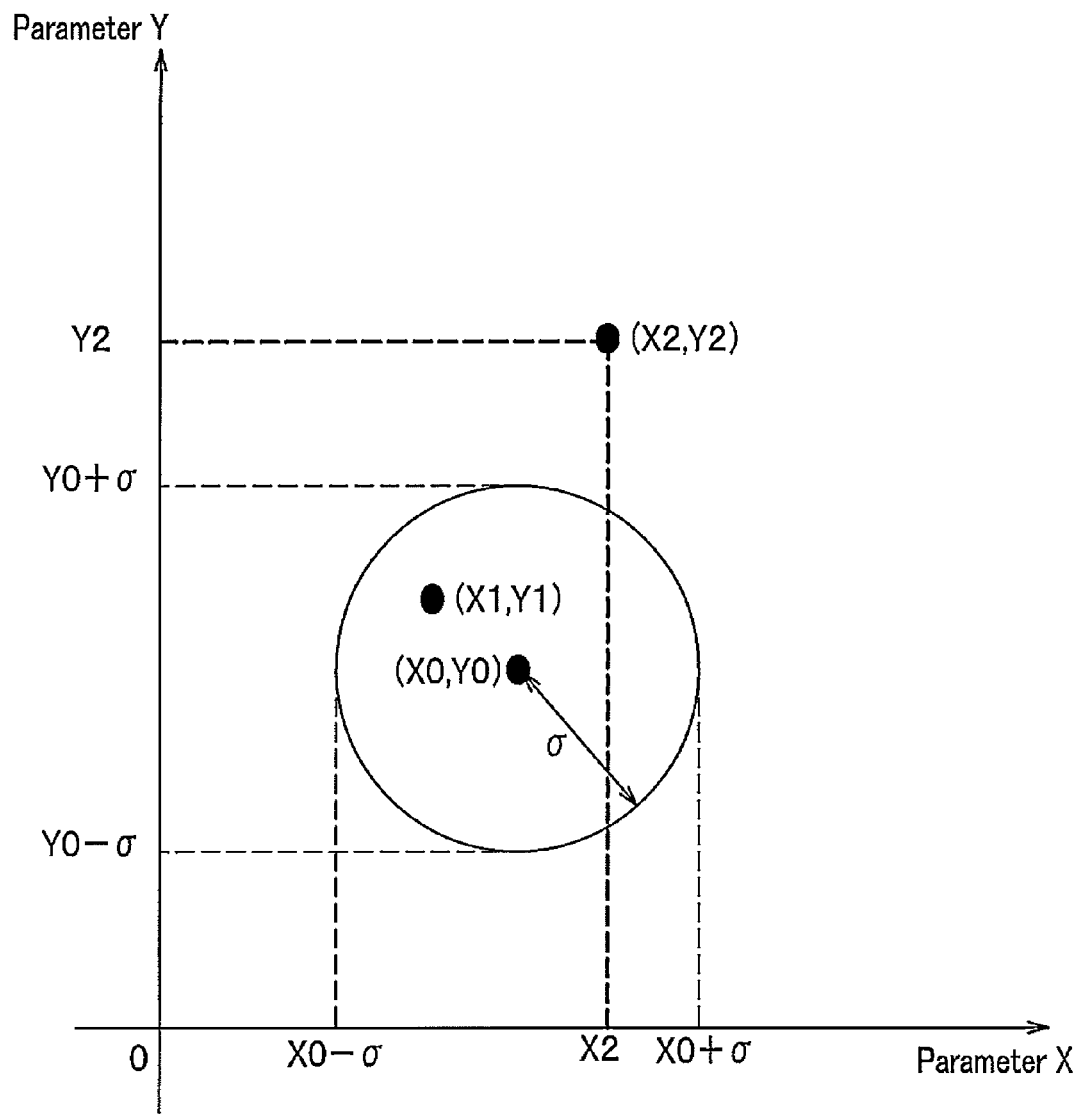
FIG. 6 is an explanatory diagram illustrating a method of determining whether or not there is relevancy in the newly-inputted operation information according to the embodiment.

More specifically, the relevancy verification part 32 draws a circle with a radius of the standard deviation ($\sigma$) acquired in step S402 and with the centroid (X0, Y0) acquired in step S401 at its center, on a plane of coordinates which has the "cooling water pressure" on the x-axis and the "cooling water temperature" on the y-axis (see FIG. 6).

Note that the radius used herein is not limited to the standard deviation ($\sigma$) just as it is, and may be a t-fold standard deviation ($\sigma$) (wherein t is an arbitrary positive number).

In step S404, the relevancy verification part 32 determines whether or not the newly-inputted operation information is within the appropriate region.

More specifically, the relevancy verification part 32 determines whether or not the point which has the value of the "cooling water pressure" as the x-coordinate and which has the value of the "cooling water temperature" as the y-coordinate with respect to the newly-inputted operation information is situated within the circle drawn in step S403 or on a circumference of the circle. If the point is situated within the circle or on the circumference thereof (if "YES" in step S404), the relevancy verification part 32 advances the processing to step S405. If not (if "NO" in step S404), the relevancy verification part 32 advances the processing to step S406.

In FIG. 6, for example, if the coordinate of the point representing the newly-inputted operation information falls on (X1, Y1), the processing advances to step S405. If the coordinate of the point representing the newly-inputted operation information falls on (X2, Y2), the processing advances to step S406.

In step S405, the relevancy verification part 32 determines that "there is relevancy". For example, the operation information represented by the point (X1, Y1) is determined to be significantly close to the past operation information which have been associated with similar maintenance information.

The processing then returns to step S305.

In step S406, the relevancy verification part 32 determines that "there is no relevancy" and specifies an abnormal parameter.

More specifically, the relevancy verification part 32 determines whether or not each of the parameters of the newly-inputted operation information is within a range of plus or minus "$\sigma$" with a coordinate value of the parameter of the centroid at its center. If the parameter is not within the range, the relevancy verification part 32 determines that "there is no relevancy" and specifies the parameter as an "abnormal parameter".

In FIG. 6, for example, with respect to the point (X2, Y2) representing the operation information, a value of a parameter regarding the "cooling water pressure" (X2) is situated within a range between "X0–$\sigma$" and "X0+$\sigma$". However, a value of a parameter regarding the "cooling water temperature" (Y2) is not situated within a range between "Y0–$\sigma$" and "Y0+$\sigma$". In this case, the relevancy verification part 32 determines that the "cooling water temperature" is an "abnormal parameter".

In step S407, the relevancy verification part 32 generates a "too-high-value (too-small-value) warning".

More specifically, the relevance verification part 32 determines, for each abnormal parameter, whether the value of the "abnormal parameter" determined in step S406 is larger than the "coordinate value of the parameter of the centroid+$\sigma$" or smaller than the "coordinate value of the parameter of the centroid–$\sigma$". If the value of the abnormal parameter is larger than the "coordinate value of the parameter of the centroid+$\sigma$", the relevancy verification part 32 generates a "too-high-value warning" in association with the abnormal parameter. If the value of the abnormal parameter is smaller than the "coordinate value of the parameter of the centroid–$\sigma$", the relevancy verification part 32 generates a "too-low-value" in association with the abnormal parameter.

In the case shown in FIG. 6, for example, because Y2>Y0+$\sigma$, the relevancy verification part 32 generates a "too-high-value warning" in association with the "cooling water temperature".

The relevancy verification part 32 then returns the processing to step S307, while holding the "too-high-value (too-small-value) warning".

The details of step S304 have been described above assuming a case in which a result of the relevancy determination is generated using a two-dimensional plane. However, an M-dimensional coordinate can be used for generalization according to the number M (M=1, 2, 3, . . . ) of parameters.

If the operation information database 22 illustrated in FIG. 4 is used, for example, a point represented by an x-axis coordinate value obtained by calculating an average of plural values "600, 500, 400, . . . " of the "cooling water pressure" and a y-axis coordinate value obtained by calculating an average of plural values "70, 80, 90, . . . " of the "cooling water temperature" is taken as a point representing each operation information on a coordinate plane. A point having an average value of the x-coordinates and an average value of the y-coordinates of the points representing plural pieces of the operation information is a centroid. Distances between the centroid and each of the points representing the plural pieces of the operation information are calculated, based on which a standard deviation (σ) of the distances is calculated.

<Variation 1>

Step S301 can be modified as shown below in 1) to 3).

1) The information input/output part 31 displays a maintenance information registration initial screen 54 (FIG. 10 and FIG. 11) on the output unit 15. The information input/output part 31 receives an input of an operation information ID in the operation information ID column 231 and then receives a press down of an "operation information output" button 232 by a user.

2) The operation information storage part 34 searches the operation information database 22 using the inputted operation information ID as a search key and acquires searched operation information from the operation information database 22.

3) The information input/output part 31 displays an operation information post-output screen 55 (FIG. 10 and FIG. 11) on the output unit 15.

Figure 10:
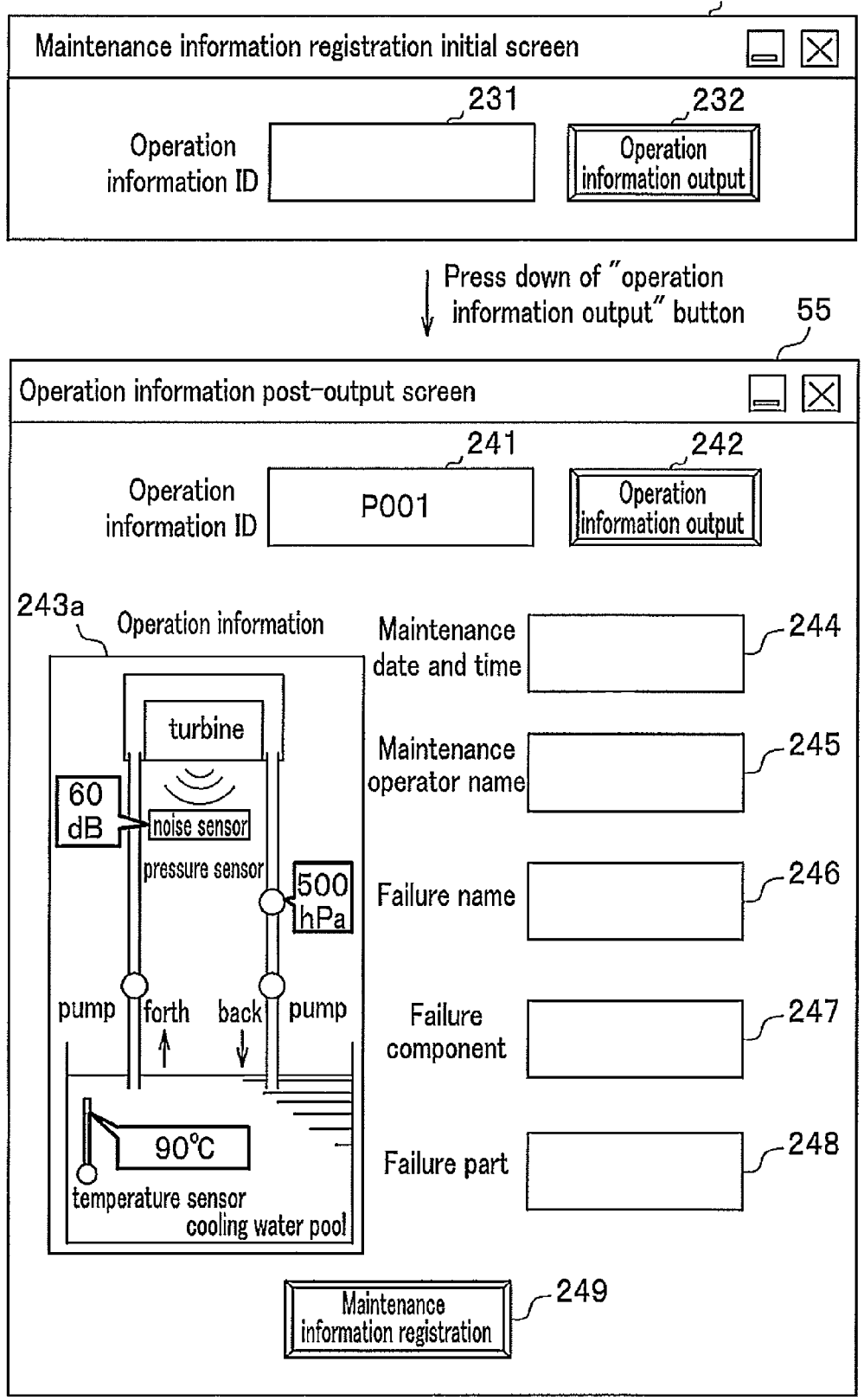
FIG. 10 is a diagram illustrating an example of a maintenance information registration initial screen and an operation information post-output screen according to the embodiment.

The example illustrated in FIG. 10 corresponds to a case where the operation information database 22 is of the type illustrated in FIG. 3. The acquired operation information is made visible and is displayed in an operation information column 243a. The example of FIG. 10 plainly illustrates that, as a result of the search by the inputted operation information ID "P001" as a key, such operation information has been acquired which has the cooling water pressure of "500 hPa", the cooling water temperature of "90 degrees Celsius", and the noise level value of "60 dB". The user inputs, while referring to the visualized operation information, a maintenance date and time, a maintenance operator name, a failure name, a failure component, and a failure part, in their respective columns 244, 245, 246, 247, and 248.

The example illustrated in FIG. 11 corresponds to a case where the operation information database 22 is of the type illustrated in FIG. 4. The acquired operation information is made visible in form of a time-series line graph and is displayed in an operation information column 243b. The example of FIG. 11 plainly illustrates that, as a result of the search by the inputted operation information ID "P101" as a key, such operation information has been acquired which has the cooling water pressures of "600 hPa at 0:00 a.m., 500 hPa at 1:00 a.m., 400 hPa at 2:00 a.m., . . . (ditto on the hour until 11:00 p.m.)", the cooling water temperatures of "70 degrees C. at 0:00 a.m., 80 degrees C. at 1:00 a.m., 90 degrees C. at 2:00 a.m., . . . (ditto on the hour until 11:00 p.m.)", and the noise level values of "60 dB at 0:00 a.m., 60 dB at 1:00 a.m., 60 dB at 2:00 a.m., . . . (ditto on the hour until 11:00 p.m.)". The user inputs, while referring to the operation information visualized as the time-series data, a maintenance date and time, a maintenance operator name, a failure name, a failure component, and a failure part, in their respective columns 244, 245, 246, 247, and 248.

Variation 1 is particularly advantageous in such a case where, for example: operation information on a specific device is periodically and automatically acquired; a user visually recognizes a plurality of parameters of the device all together or visually recognizes a relationship of time-series changes between a plurality of the parameters; and the user inputs the maintenance information, based on the parameters or the relationship.

<Variation 2>

In step S404, the relevancy verification part 32 determines whether or not the newly-inputted operation information is within an appropriate range. The radius of the "circle" used in the determination is not directly related to the number of pieces of the operation information acquired in step S303. That is, whether the number is, for example, "10" or "100", the radii of the two circles may eventually take similar values. However, if the number is "100", the radius (the standard deviation σ) corresponding thereto is statistically more reliable.

If a result of the determination in step S404 is "NO" (the newly-inputted operation information is not within an appropriate range (circle)) and also if the number of the operation information acquired in step S303 is "10", the newly-inputted operation information is compared to only as much as 10 pieces of past operation information. Reliability on the determination that the newly-inputted operation information is different from the past instances is thus relatively low. On the other hand, if the result of the determination in step S404 is "NO" (the newly-inputted operation information is not within an appropriate range (circle)) and also if the number of the operation information acquired in step S303 is "100", the newly-inputted operation information is compared to the enough number of 100 pieces of the past operation information. Reliability on the determination that the newly-inputted operation information is different from the past instances is thus relatively high.

Based on the described above, apart of the aforementioned processing can be modified as shown in the following 1) and 2).

1) Step S303 is modified as below.

In step S303, the maintenance operation instance storage part 33 acquires an instance.

More specifically, the maintenance operation instance storage part 33 searches the maintenance operation instance database 21 using a failure name, a failure component, and a failure part received in step S302, as search keys. The maintenance operation instance storage part 33 then acquires: respective operation information of all instances each of whose maintenance information includes the failure name, the failure component, and the failure part as the search keys; and the number of pieces of the matched operation information.

2) A new substep as follows is added to step S307 immediately after the "second" substep thereof and immediately before the "third" substep thereof.

The information input/output part 31 generates a "reliability level" based on the number of pieces of the operation information matched and acquired in step S303. The reliability level may be indicated by any numerical value as long as the numerical value gets larger as the number of pieces of the matched operation information gets larger. For example, a table which shows correspondence relationship between the number of pieces of the operation information and the reliability level may be stored in the supplemental storage unit 13. An example of such a table is that: if the number of pieces of the matched operation information is not less than 1 and less than 10, the reliability level is "1"; if not less than 10 and less than 50, "2"; and if not less than 50, "3".

Another table which shows comments each associated with the reliability level may be stored in the supplemental storage unit 13. An example of such a table is that: if the reliability level is "3", a comment corresponding thereto is "The operation information currently inputted has already been compared to a sufficient number of past instances, based on which you are requested to re-enter the maintenance information."; if the reliability level is "2", "The operation information currently inputted has already been compared to a considerable number of the past instances, based on which you are requested to re-enter the maintenance information for confirmation."; and, if the reliability level is "1", "The number of the past instances to be compared to the operation information currently inputted is not sufficient. You may exit without re-entering the maintenance information."

The information input/output part 31 acquires a reliability level from the appropriate table stored in the supplemental storage unit 13 using the number of the matched operation information as a search key. The information input/output part 31 also acquires a comment from the appropriate table stored in the supplemental storage unit 13 using the acquired reliability level as a search key. The information input/output part 31 displays the acquired reliability level and the acquired comment as well as the number of the matched operation information, in the message column 221.

Variation 2 allows a user to re-input maintenance information after the user well understands reliability of the processing by the maintenance operation instance collection apparatus 1.

<Variation 3>

The number of pieces of the operation information acquired in step S303 varies according to accuracy of the newly-inputted maintenance information. For example, let a correct input of a failure name, a failure component, and a failure part of the newly-inputted maintenance information be "liquid leakage", "cooling water pipe", and "joint". Assume a case in which "liquid leakage", "cooling water pipe", and "bearing" are inputted in error. This is likely to lead the number of pieces of the operation information acquired in step S303 smaller than it should be when correctly inputted. Assume another case in which "liquid leakage", "muffler", and "bearing" are inputted in error. In this case, the number of pieces of the operation information acquired in step S303 is likely to be still far smaller than that of the correct input.

As described above, the more the number of erroneously-inputted items of the maintenance information, the less the number of pieces of similar maintenance information in the past. As a result, the number of pieces of the operation information acquired in step S303 is decreased.

Thus, a part of the aforementioned processing can be modified as shown in the following 1) and 2).

1) Step S303 is modified as below.

In step S303, the maintenance operation instance storage part 33 acquires an instance.

More specifically, the maintenance operation instance storage part 33 searches the maintenance operation instance database 21 using a failure name, a failure component, and a failure part received in step S302, as search keys. The maintenance operation instance storage part 33 then acquires: respective operation information of all instances each of whose maintenance information includes the failure name, the failure component, and the failure part as the search keys; and the number of pieces of the matched operation information.

2) A new substep as follows is added to step S307 immediately after the "second" substep thereof and immediately before the "third" substep thereof.

The information input/output part 31 generates a "request level" based on the number of the operation information matched and acquired in step S303. The request level may be indicated by any numerical value as long as the numerical value gets smaller, as the number of pieces of the matched operation information gets larger. The value may be, for example, the number of items of the maintenance information to be re-inputted. For example, a table which shows correspondence relationship between the number of pieces of the matched operation information and the request level may be stored in the supplemental storage unit 13. An example of such a table is that: if the number of the matched operation information is not less than 0 and less than 5, the request level is "2"; and if not less than 5, "1". Based on the above, the information input/output part 31 acquires a request level from the table stored in the supplemental storage unit 13 using the number of the matched operation information as a search key. The information input/output part 31 then displays a message saying that "You are requested to review inputs of at least x items", in the message column 221 of the maintenance information reregistration screen 53 (FIG. 9).

Variation 3 allows a user to specifically know the number of items of the maintenance information to be re-inputted.

<Variation 4>

There may be a case in which, as a result of a user's mistake in reading the operation information (for example, a sensor value) or in performing an input operation via a keyboard or the like, the processing proceeds to step S307. In this case, it is convenient for the user to re-input the operation information.

The processing described above is performed in such a manner that "Then, the processing returns to step S303. In the iteration, after step S303, the processing may skip step S304, perform step S305 and step S306, and then terminate". Instead, the processing may be performed in such a manner that "Then, the processing returns to step S301. In the iteration, the processing skips step S302. After step S303, step S304 is skipped. The processing performs step S305 and step S306, and then terminates".

Variation 4 can prevent such an inconvenience that: if operation information having been inputted is incorrect, then a user re-inputs appropriate maintenance information corresponding thereto; nevertheless the user is repeatedly prompted to re-input the maintenance information.

<Variation 5>

If the number of items (such as a failure name, a failure component, and a failure part) of the maintenance information actually inputted in step S302 is small, that is, if the number of search keys for an AND condition is small, the number of pieces of the operation information acquired in step S303 may become too large. In this case, the procedure in step S304 (calculation of a centroid, a standard deviation, or the like) may take excessive time.

Thus, a part of the aforementioned processing can be modified as shown in the following 1) and 2).

1) A new substep as follows is added to step S302 immediately after the "second" substep thereof and immediately before the "third" substep thereof.

If there is an item of the maintenance information which should have been inputted but was actually not, the information input/output part 31 holds the number of the not-having-been-inputted item as "the number of not-having-been-inputted items".

2) A new substep as follows is added to the end of step S303.

If the number of the acquired operation information exceeds a prescribed threshold, the maintenance operation instance storage part 33 determines a difference between the acquired number and the threshold as an "excess hit count". The maintenance operation instance storage part 33 determines such a numerical value that becomes larger as the excess hit count becomes larger, as the "number of additional input items" according to a prescribed criterion. The "number of additional input items" is set so as not to exceed the "number of not-having-been-inputted items".

The information input/output part 31 also makes the output unit 15 display a message such as "You are requested to additionally input items of the maintenance information as much as the "number of additional input items"" and the maintenance information registration screen 51 (FIG. 7), and receives the additional input from a user. Then, the information input/output part 31 performs a search again.

Variation 5 can reduce a processing load on the maintenance operation instance collection apparatus 1.

The present invention is not limited to the aforementioned embodiment and various changes are possible without departing from the gist of the present invention.

DESCRIPTION OF REFERENCE NUMERALS 1 maintenance operation instance collection apparatus
11 central processing unit
12 main storage unit
13 supplemental storage unit
14 input unit
15 output unit
21 maintenance operation instance database
22 operation information database
23 maintenance information
31 information input/output part
32 relevancy verification part
33 maintenance operation instance storage part
34 operation information storage part

The invention claimed is:

1. A maintenance operation instance collection apparatus which manages a maintenance instance of a device, comprising:
 a storage unit that includes a maintenance operation instance database in which operation information obtained from the device via a sensor and maintenance information entered by a maintenance operator on a measure to deal with the operation information corresponding thereto, are stored in association with each other; and
 a control unit that:
  receives an input of new operation information,
  receives an input of new maintenance information by the maintenance operator,
  searches the maintenance operation instance database using the newly-received maintenance information entered by the maintenance operator as a search key, and acquires searched operation information,
  compares the newly-received operation information to the acquired operation information, and determines whether or not the newly-received operation information is close to the acquired operation information in such a degree of satisfying a prescribed criterion, and,
  if the newly-received operation information is not determined to be close to the acquired operation information, prompts a re-input of the newly-received maintenance information to the maintenance operator.

2. The maintenance operation instance collection apparatus according to claim 1,
 wherein, if the newly-received operation information is determined to be close to the acquired operation information, the control unit stores the newly-received operation information and the newly-received maintenance information entered by the maintenance operator in associated with each other, in the maintenance operation instance database as a record thereof.

3. The maintenance operation instance collection apparatus according to claim 1,
 wherein the operation information includes a parameter which is made up of plural values obtained from sensors, and
 wherein, if the newly-received operation information is not determined to be close to the acquired operation information, from among parameters included in the newly-received operation information, displays a parameter of specified sensors which is different from a corresponding parameter included in the acquired operation information in such a degree of satisfying a prescribed criterion.

4. The maintenance operation instance collection apparatus according to claim 1,
 wherein the maintenance information entered by the maintenance operator after a maintenance operation, includes at least one of a failure name representing what is a failure in the device, a name of a failure component exchanged by a maintenance operator, and a name of a failure part at which the exchanged component failed.

5. The maintenance operation instance collection apparatus according to claim 1,
 wherein the control unit:
  searches the maintenance operation instance database using the newly-received maintenance information as a search key, acquires the matched operation information, and also acquires the number of pieces of the matched and acquired operation information,
  determines a reliability level which is a numerical value which gets larger as the number of pieces of the matched operation information gets larger, and
  displays the determined reliability level at a time of prompting the re-input of the newly-received maintenance information.

6. A maintenance operation instance collection method using a maintenance operation instance collection apparatus which manages a maintenance instance of a device, a storage unit of the maintenance operation instance collection apparatus including a maintenance operation instance database in which operation information obtained from the device via a sensor and maintenance information entered by a maintenance operator on a measure to deal with the operation information corresponding thereto, are stored in association with each other, the maintenance operation instance collection method comprising operations, performed by a control unit of the maintenance operation instance collection apparatus, of:
 receiving an input of new operation information;
 receiving an input of new maintenance information by the maintenance operator;
 searching the maintenance operation instance database using the newly-received maintenance information entered by the maintenance operator as a search key and acquiring searched operation information;
 comparing the newly-received operation information to the acquired operation information, and determining whether or not the newly-received operation information is close to the acquired operation information in such a degree of satisfying a prescribed criterion; and,
 if the newly-received operation information is not determined to be close to the acquired operation information, prompting a re-input of the newly-received maintenance information to the maintenance operator.

7. The maintenance operation instance collection method according to claim 6, further comprising an operation, performed by the control unit, of,
 if the newly-received operation information is determined to be close to the acquired operation information, storing the newly-received operation information and the newly-received maintenance information entered by the maintenance operator in association with each other, in the maintenance operation instance database as a record thereof.

8. The maintenance operation instance collection method according to claim 6,
   wherein the operation information includes a parameter which is made up of plural values obtained from sensors, and
   the maintenance operation instance collection method further comprising an operation, performed by the control unit, of,
      if the newly-received operation information is not determined to be close to the acquired operation information, from among parameters included in the newly-received operation information, displaying a parameter of specified sensors which is different from a corresponding parameter included in the acquired operation information in such a degree of satisfying a prescribed criterion.

9. The maintenance operation instance collection method according to claim 6,
   wherein the maintenance information entered by the maintenance operator after a maintenance operation, includes at least one of a failure name representing what is a failure in the device, a name of a failure component exchanged by a maintenance operator, and a name of a failure part at which the exchanged component failed.

10. The maintenance operation instance collection method according to claim 6, further comprising an operation, performed by the control unit, of,
    searching the maintenance operation instance database using the newly-received maintenance information as a search key, acquiring the searched operation information, and also acquiring the number of pieces of the searched and acquired operation information,
    determining a reliability level which is a numerical value which gets larger as the number of pieces of the searched operation information gets larger, and
    displaying the determined reliability level at a time of prompting the re-input of the newly-received maintenance information.

11. A maintenance operation instance collection method using a maintenance operation instance collection apparatus which manages a maintenance instance of a device, a storage unit of the maintenance operation instance collection apparatus including a maintenance operation instance database in which operation information obtained from the device via a sensor and maintenance information entered by the maintenance operator on a measure to deal with the operation information corresponding thereto, are stored in association with each other, and an operation information database in which the operation information is stored in association with an identifier uniquely identifying the operation information, the maintenance operation instance collection method comprising operations, performed by the control unit of the maintenance operation instance collection apparatus, of:
    receiving an input of a new identifier;
    receiving an input of new maintenance information by the maintenance operator;
    searching the operation information database using the newly-received identifier as a search key and acquiring searched operation information as first operation information;
    searching the maintenance operation instance database using the newly-received maintenance information entered by the maintenance operator as a search key and acquiring searched operation information as second operation information;
    comparing the acquired first operation information to the acquired second operation information, and determining whether or not the acquired first operation information is close to the acquired second operation information in such a degree of satisfying a prescribed criterion; and,
    if the acquired first operation information is not determined to be close to the acquired second operation information, prompting a re-input of the newly-received maintenance information to the maintenance operator.

* * * * *